US011312803B2

(12) United States Patent
Brusseau et al.

(10) Patent No.: US 11,312,803 B2
(45) Date of Patent: Apr. 26, 2022

(54) VINYLIDENE FLUORIDE POLYMER

(71) Applicant: SOLVAY SPECIALTY POLYMERS ITALY S.P.A., Bollate (IT)

(72) Inventors: Ségolène Brusseau, Tavaux (FR); Julio A. Abusleme, Saronno (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 374 days.

(21) Appl. No.: 16/472,852

(22) PCT Filed: Dec. 18, 2017

(86) PCT No.: PCT/EP2017/083230
§ 371 (c)(1),
(2) Date: Jun. 21, 2019

(87) PCT Pub. No.: WO2018/114753
PCT Pub. Date: Jun. 28, 2018

(65) Prior Publication Data
US 2020/0190239 A1 Jun. 18, 2020

(30) Foreign Application Priority Data

Dec. 22, 2016 (EP) .................................. 16306772

(51) Int. Cl.
*C08F 214/22* (2006.01)
*H01M 4/62* (2006.01)
*H01M 50/40* (2021.01)
*H01M 50/411* (2021.01)

(52) U.S. Cl.
CPC ......... *C08F 214/225* (2013.01); *H01M 4/623* (2013.01); *H01M 50/411* (2021.01)

(58) Field of Classification Search
CPC .. C08F 214/225; H01M 4/623; H01M 50/411
USPC .......................................................... 526/200
See application file for complete search history.

(56) References Cited

U.S. PATENT DOCUMENTS

| 8,377,725 B2* | 2/2013 | Fujitomo | H01L 31/02002 |
| | | | 438/26 |
| 10,676,549 B2* | 6/2020 | Abusleme | C08F 114/22 |
| 2010/0133482 A1* | 6/2010 | Abusleme | C08J 5/2237 |
| | | | 252/511 |
| 2015/0349309 A1* | 12/2015 | Abusleme | C08J 5/2268 |
| | | | 429/251 |
| 2017/0253678 A1* | 9/2017 | Abusleme | C08L 27/16 |

FOREIGN PATENT DOCUMENTS

| GB | 1349764 A | 4/1974 | |
| WO | 2008129041 A1 | 10/2008 | |
| WO | WO-2008129041 A1 * | 10/2008 | .......... C08F 214/225 |
| WO | 2014095907 A1 | 6/2014 | |
| WO | 2015081055 A1 | 6/2015 | |
| WO | 2016041808 A1 | 3/2016 | |
| WO | WO-2016041808 A1 * | 3/2016 | .............. C08L 27/16 |

* cited by examiner

*Primary Examiner* — Michael M. Bernshteyn
(74) *Attorney, Agent, or Firm* — Osha Bergman Watanabe & Burton LLP

(57) ABSTRACT

The present invention pertains to a vinylidene fluoride polymer, to a process for manufacturing said vinylidene fluoride polymer and to an article comprising said vinylidene fluoride polymer.

19 Claims, No Drawings

VINYLIDENE FLUORIDE POLYMER

CROSS-REFERENCE TO RELATED APPLICATION

This application is a U.S. national stage entry under 35 U.S.C. § 371 of International Application No. PCT/EP2017/083230 filed Dec. 18, 2017, which claims priority to European application No. EP 16306772.1 filed Dec. 22, 2016. The entire contents of these applications are explicitly incorporated herein by this reference.

TECHNICAL FIELD

The present invention pertains to a vinylidene fluoride polymer, to a process for manufacturing said vinylidene fluoride polymer and to an article comprising said vinylidene fluoride polymer.

BACKGROUND ART

Vinylidene fluoride polymers are advantageously used in several different applications.

Vinylidene fluoride polymers are obtainable by polymerization of vinylidene fluoride either by suspension polymerization or by emulsion polymerization.

Copolymerizing vinylidene fluoride and a hydrophilic (meth)acrylic monomer remains an uneasy task, due to the very different reactivity of such monomers.

Thus, while random distribution is targeted, blocky-type structures are obtained. This uneven distribution of the hydrophilic (meth)acrylic monomer units dramatically affects the thermal stability of the copolymer itself.

Linear semi-crystalline copolymers having improved thermal stability have been described in WO 2008/129041 (SOLVAY SPECIALTY POLYMERS ITALY S.P.A.) 30 Oct. 2008, said copolymers comprising recurring units derived from vinylidene fluoride and from 0.05% to 10% by moles of recurring units derived from at least one hydrophilic (meth)acrylic monomer, wherein the fraction of randomly distributed units of said hydrophilic (meth)acrylic monomer is of at least 40%.

However, during suspension polymerization of vinylidene fluoride, reactor fouling (that is build-up of polymer deposits on the inner surfaces of the reactor and/or of the stirring equipment) may be observed, which prevents the scaling of the process to industrial production.

It is hence common in suspension polymerization of vinylidene fluoride to make use of a suspending agent, so as to prevent scaling and build-up of deposits of polymers; nevertheless, where a suspending agent is present, although fouling may be avoided, control of the reaction may be not enough stable to scale-up the product to industrial level.

WO 2016/041808 (SOLVAY SPECIALTY POLYMERS ITALY SPA) 24 Mar. 2016 discloses a process for manufacturing a vinylidene fluoride polymer, said process comprising polymerizing vinylidene fluoride (VDF) in aqueous suspension in the presence of at least: a) an alkylene oxide polymer (PAO); and b) a polysaccharide derivative, wherein the PAO has formula (I) $R_A O—[(CH_2)_m O]_n—R_B$ (I) wherein $R_A$ and $R_B$ are, independently from each other, H or a $C_1$-$C_5$ linear or branched alkyl, preferably H or $CH_3$, m, equal to or different from each other at each occurrence, is an integer from 2 to 5, and n is an integer from 1000 to 200000. The said process does not generate fouling of the reactor during the polymerization and yields a polymer that is more resistant than PVDF polymers of the prior art to discoloration upon exposure to concentrated acids or to acidic solutions. Nevertheless, this document is silent having regards to the control of the process, and more specifically, control of polymerization temperature.

Indeed, reaction controls, and more particularly polymerization temperature control, are key aspects which are mandatory for applying a process at industrial scale, whereas smoothness of operations, and predictability of all process parameters are to be ensured.

There is thus still the need in the art for a process for manufacturing a vinylidene fluoride polymer that is feasible on industrial scale and enables obtaining vinylidene fluoride polymers having good colour stability.

SUMMARY OF INVENTION

It has been now surprisingly found that the process of the present invention advantageously enables obtaining vinylidene fluoride polymers further comprising recurring units derived from (meth)acrylic monomers through a process which can be accurately controlled, e.g. with no sudden heat generation causing uncontrolled reaction temperatures exceeding set-points, while still avoiding fouling of the reactor. This is particularly critical when feeding in the reactor monomers possessing very different polymerization kinetics, such as vinylidene fluoride and (meth)acrylic polymers, which may cause local phenomena of uncontrolled polymerization.

In particular, it has been found that the process of the invention successfully allows accurate control of the polymerization, as measured through the deviation of actual reaction temperature with respect to set-point temperature.

Also, it has been surprisingly found that the vinylidene fluoride polymer of the present invention advantageously exhibits good colour retention in combination with good thermal stability to be suitably used in various applications.

In a first instance, the present invention pertains to a process for manufacturing a vinylidene fluoride polymer [polymer (VDF)], said process comprising polymerizing vinylidene fluoride and from 0.01% to 10% by moles, preferably from 0.05% to 8% by moles, more preferably from 0.1% to 3% by moles, with respect to the total amount of moles of said vinylidene fluoride, of at least one (meth) acrylic monomer [monomer (MA)] and, optionally, at least one fluorinated monomer different from vinylidene fluoride in an aqueous suspension medium comprising:

at least one polyalkylene oxide of formula (I):

$$R_A O—[(CH_2)_m O]_n—R_B \quad \text{(I)}$$

wherein $R_A$ and $R_B$, equal to or different from each other, are H or a $C_1$-$C_5$ linear or branched alkyl group, preferably H or $CH_3$, m, equal to or different from each other at each occurrence, is an integer from 2 to 5, and n is an integer from 1000 to 200000, preferably from 2000 to 100000, more preferably from 5000 to 70000, and at least one polysaccharide derivative in an amount of from 0.01 to 5 g, preferably of from 0.05 to 2.5 g, more preferably of from 0.1 to 1.5 g, even more preferably of from 0.4 to 0.8 g per Kg of vinylidene fluoride.

In a second instance, the present invention pertains to a vinylidene fluoride polymer [polymer (VDF)] obtainable by the process of the invention.

The polymer (VDF) typically comprises:

recurring units derived from vinylidene fluoride, from 0.05% to 5% by moles, preferably from 0.1% to 3% by moles, with respect to the total amount of moles of recurring units in said polymer (VDF), of recurring units derived from at least one (meth)acrylic monomer [monomer (MA)], and optionally, recurring units derived from at least one fluorinated monomer different from vinylidene fluoride.

For the purpose of the present invention, the term "vinylidene fluoride (VDF) polymer" is intended to denote a polymer comprising more than 50% by moles of recurring units derived from vinylidene fluoride.

The monomer (MA) is typically of formula (II):

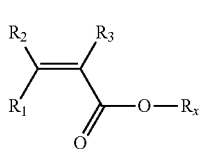

(II)

wherein $R_1$, $R_2$ and $R_3$, equal to or different from each other, are independently a hydrogen atom or a $C_1$-$C_3$ hydrocarbon group, and $R_X$ is a hydrogen or a $C_1$-$C_5$ hydrocarbon group optionally comprising at least one hydroxyl group.

Non-limiting examples of monomers (MA) of formula (II) are notably acrylic acid, methacrylic acid, hydroxyethyl (meth)acrylate, hydroxypropyl(meth)acrylate; hydroxyethylhexyl (meth)acrylates.

The monomer (MA) is preferably selected from the group consisting of:

hydroxyethylacrylate (HEA) of formula:

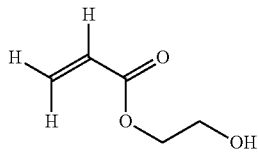

2-hydroxypropyl acrylate (HPA) of either of formulae:

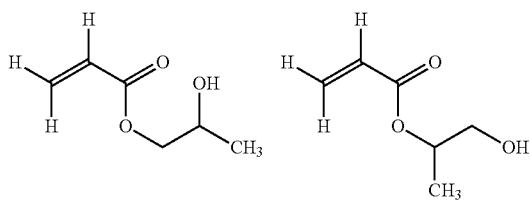

acrylic acid (AA) of formula:

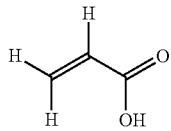

and mixtures thereof.

Most preferably, the monomer (MA) is AA and/or HEA.

For the purpose of the present invention, the term "fluorinated monomer" is intended to denote an ethylenically unsaturated monomer comprising at least one fluorine atom.

Should the fluorinated monomer comprise at least one hydrogen atom, it is designated as hydrogen-containing fluorinated monomer.

Should the fluorinated monomer be free of hydrogen atoms, it is designated as per(halo)fluorinated monomer.

The fluorinated monomer may further comprise one or more other halogen atoms (Cl, Br, I).

The polymer (VDF) typically further comprises from 0.1% to 10% by moles, preferably from 0.2% to 5% by moles, with respect to the total amount of moles of recurring units in said polymer (VDF), of recurring units derived from at least one fluorinated monomer different from vinylidene fluoride.

Non-limiting examples of fluorinated monomers different from vinylidene fluoride comprise, notably, the following:

(i) $C_2$-$C_8$ fluoroolefins such as trifluoroethylene (TrFE), tetrafluoroethylene (TFE) and hexafluoropropylene (HFP);

(ii) perfluoroalkylethylenes of formula $CH_2$=CH—$R_{f0}$, wherein $R_{f0}$ is a $C_2$-$C_6$ perfluoroalkyl group;

(iii) chloro- and/or bromo- and/or iodo-$C_2$-$C_6$ fluoroolefins such as chlorotrifluoroethylene (CTFE);

(iv) perfluoroalkylvinylethers of formula $CF_2$=CFOR$_{f1}$, wherein $R_{f1}$ is a $C_1$-$C_6$ perfluoroalkyl group, such as perfluoromethylvinylether (PMVE) and perfluoropropylvinylether (PPVE);

(v) (per)fluorooxyalkylvinylethers of formula $CF_2$=CFOX$_0$, wherein $X_0$ is a $C_1$-$C_{12}$ oxyalkyl group or a $C_1$-$C_{12}$ (per)fluorooxyalkyl group having one or more ether groups, e.g. perfluoro-2-propoxy-propyl group;

(vi) (per)fluoroalkylvinylethers of formula $CF_2$=CFOCF$_2$OR$_{f2}$, wherein $R_{f2}$ is a $C_1$-$C_6$ (per)fluoroalkyl group, e.g. —$CF_3$, —$C_2F_5$, —$C_3F_7$, or a $C_1$-$C_6$ (per)fluorooxyalkyl group having one or more ether groups, e.g. —$C_2F_5$—O—$CF_3$;

(vii) functional (per)fluorooxyalkylvinylethers of formula $CF_2$=CFOY$_0$, wherein $Y_0$ is selected from a $C_1$-$C_{12}$ alkyl group or (per)fluoroalkyl group, a $C_1$-$C_{12}$ oxyalkyl group and a $C_1$-$C_{12}$ (per)fluorooxyalkyl group having one or more ether groups, $Y_0$ comprising a carboxylic or sulfonic acid group, in its acid, acid halide or salt form;

(viii) fluorodioxoles, especially perfluorodioxoles;

(ix) vinyl fluoride, and their mixtures.

Most preferred fluorinated monomers are chlorotrifluoroethylene (CTFE), trifluoroethylene (TrFE), tetrafluoroethylene (TFE), hexafluoropropylene (HFP) and perfluoromethylvinylether (PMVE).

The polymer (VDF) preferably comprises, more preferably consists of:

recurring units derived from vinylidene fluoride, from 0.1% to 3% by moles, with respect to the total amount of moles of recurring units in said polymer (VDF), of recurring units derived from at least one (meth)acrylic monomer [monomer (MA)], and from 0.1% to 10% by moles, preferably from 0.2% to 5% by moles, with respect to the total amount of moles of recurring units in said polymer (VDF), of recurring units derived from hexafluoropropylene (HFP).

For the purpose of the present invention, the term "polyalkylene oxide" is intended to denote a homopolymer or copolymer consisting essentially of recurring units derived from linear alkylene oxide(s). For the purpose of the present invention, the term "poly(alkylene oxide)" does not encompass polymers including recurring units derived from branched alkylene oxide(s), e.g. 2-propylene units (—CH(CH$_3$)CH$_2$—).

Polyalkylene oxides of formula (I) suitable for use in the process of the invention are typically, but not exclusively, selected from the group consisting of homopolymers consisting of recurring units derived from ethylene oxide (EO), such as polyethylene glycols (also indicated as PEGs, POEs or PEOs).

The polyalkylene oxide of formula (I) typically has an average molecular weight ($M_v$) of from 50,000 to 10,000,000 g/mol as measured by any techniques generally known to the person skilled in the art such as by determination of the viscosity of a solution of said polyalkylene oxide of formula (I) in water.

The polyalkylene oxide of formula (I) is preferably a polyethylene oxide of formula (I-A):

wherein $R'_A$ and $R'_B$, equal to or different from each other, are H or a $C_1$-$C_5$ linear or branched alkyl group, preferably H or $CH_3$, and n' is an integer from 1000 to 200000, preferably from 2000 to 100000, more preferably from 5000 to 70000.

The polyalkylene oxide of formula (I) is more preferably a polyethylene glycol of formula (I-B):

wherein n" is an integer from 1000 to 200000, preferably from 2000 to 100000, more preferably from 5000 to 70000.

The process of the invention is typically carried in the presence of at least one polyalkylene oxide of formula (I), preferably of at least one polyethylene oxide of formula (I-A), more preferably of at least one polyethylene glycol of formula (I-B), in an amount of from 0.01 to 5 g, preferably of from 0.01 to 2 g, more preferably of from 0.05 to 1.5 g of per Kg of vinylidene fluoride.

For the purpose of the present invention, the term "polysaccharide derivative" is intended to denote a derivative of a polysaccharide polymer comprising recurring units derived from glycosidic units linked to each other by glycosidic bonds.

The glycosidic units are either six-membered pyranoside rings or five-membered furanoside rings.

Non-limiting examples of suitable six-membered pyranosides include, notably, D-glucopyranosides such as α-D-glucopyranosides or β-D-glucopyranosides.

Non-limiting examples of suitable five-membered furanosides include, notably, D-glucofuranosides such as α-D-glucofuranosides or β-D-glucofuranosides.

Unless otherwise specified, the dynamic viscosity of the polysaccharide derivative and of the other polymers in the process of the invention is measured according to ASTM D445 at 20° C. in an aqueous solution at a concentration of 2% by weight.

Preferably, in the process of the present invention the dynamic viscosity of the polysaccharide derivative is of from 1 to 30,000 mPa·s, preferably from 3 to 21,000 mPa·s, more preferably from 50 to 15,000 mPa·s, even more preferably from 80 to 13,000 mPa·s, still more preferably from 120 to 11,250 mPa·s, as measured according to ASTM D445 at 20° C. in an aqueous solution at a concentration 2% by weight.

More preferably, in the process of the present invention the dynamic viscosity of the polysaccharide derivative is of from 2.4 to 3.6 mPa·s, preferably of from 80 to 120 mPa·s, more preferably of from 11,250 to 21,000 mPa·s, as measured according to ASTM D445 at 20° C. in an aqueous solution at a concentration of 2% by weight.

Preferably, in the process of the present invention the polysaccharide derivative comprises recurring units derived from glycosidic units selected from the group consisting of D-glucopyranosides, D-glucofuranosides and mixtures thereof, said glycosidic units being linked to each other by glycosidic bonds.

More preferably, in the process of the present invention the polysaccharide derivative comprises recurring units derived from β-D-glucopyranosides of

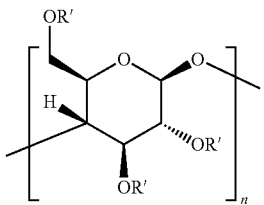

wherein each R', equal to or different from any other at each occurrence, represents a hydrogen atom, a $C_1$-$C_8$ hydrocarbon group or a $C_2$-$C_8$ hydroxyalkyl group.

Even more preferably, in the recurring units derived from β-D-glucopyranosides of formula (III), each R', equal to or different from any other, is a hydrogen atom, a methyl group, a hydroxyethyl group or a 2-hydroxypropyl group.

Still more preferably, in the process of the invention the polysaccharide derivative is selected from the group consisting of methylcellulose, hydroxyethyl methylcellulose, hydroxyethyl ethylcellulose and hydroxypropyl methylcellulose.

Preferably, in the process of the invention the polysaccharide derivative is hydroxyethyl ethylcellulose or hydroxypropyl methylcellulose.

The hydroxyethyl ethylcellulose typically has a methoxy degree of substitution (i.e. the average number per mole of groups R', wherein R' is methyl group in formula (III), with respect to the total number of groups R') of from 0.5 to 2.0 (e.g. 0.9) and/or a hydroxypropyl degree of substitution (i.e. the average number per mole of groups R', wherein R' is 2-hydroxypropyl group in formula (III), with respect to the total number of groups R') of from 0.5 to 1.0 (e.g. 0.8).

As non-limiting examples, the hydroxyethyl ethylcellulose in the process of the invention has a dynamic viscosity of from 260 to 360 mPa·s at 20° C. in an aqueous solution at a concentration of 2% by weight.

Non-limiting examples of polysaccharide derivatives suitable for use in the process of the invention include, notably, hydroxyethyl ethylcellulose derivatives available under the trademark names BERMOCOLL® E 230 FQ.

The hydroxypropyl methylcellulose typically has a methoxy degree of substitution (i.e. the average number per mole of groups R', wherein R' is methyl group in formula (III), with respect to the total number of groups R') of from 1.2 to 2.0 (e.g. 1.4) and/or a hydroxypropyl degree of substitution (i.e. the average number per mole of groups R', wherein R' is 2-hydroxypropyl group in formula (III), with respect to the total number of groups R') of from 0.10 to 0.25 (e.g. 0.21).

As non-limiting examples, the hydroxypropyl methylcellulose in the process of the invention has a dynamic viscosity of from 40 to 60 mPa·s, preferably of from 80 to 120 mPa·s, more preferably of from 11,250 to 21,000 mPa·s at 20° C. in an aqueous solution at a concentration of 2% by weight.

Non-limiting examples of polysaccharide derivatives suitable for use in the process of the invention include, notably, hydroxypropyl methylcellulose derivatives available under the trademark names METHOCEL® K100, having a dynamic viscosity of 80-120 mPa·s at 20° C. in an aqueous solution at a concentration of 2% by weight, METHOCEL® K15M, having a dynamic viscosity of 11,250-21,000 mPa·s at 20° C. in an aqueous solution at a concentration of 2% by weight, METHOCEL® K3, having a dynamic viscosity of 2.4 to 3.6 mPa·s at 20° C. in an aqueous solution at a concentration of 2% by weight, METHOCEL® K4M, having a dynamic viscosity of 3000 to 6000 mPa·s at 20° C. in an aqueous solution at a concentration of 2% by weight and CULMINAL® MHPC5 having a dynamic viscosity of 4 to 8 mPa×s at 20° C. in an aqueous solution at a concentration of 2% by weight.

The weight ratio of at least one polyalkylene oxide of formula (I) to at least one polysaccharide derivative in the process of the invention is typically comprised between 1:10 and 10:1, preferably between 1:7 and 7:1.

The process of the invention is typically carried out in an aqueous suspension medium in the presence of a radical initiator. While the choice of the radical initiator is not particularly limited, it is understood that those initiators suitable for the process according to the invention are selected from compounds capable of initiating and/or accelerating the polymerization process.

Among radical initiators which may advantageously be used in the process of the invention, mention can be made of organic radical initiators.

Non-limiting examples of suitable organic radical initiators include, but are not limited to, the following: acetylcyclohexanesulfonyl peroxide; diacetylperoxydicarbonate; dialkylperoxydicarbonates such as diethylperoxydicarbonate, dicyclohexylperoxydicarbonate, di-2-ethylhexylperoxydicarbonate; tert-butylperneodecanoate; 2,2'-azobis(4-methoxy-2,4dimethylvaleronitrile); tert-butylperpivalate; tert-amylperpivalate; dioctanoylperoxide; dilauroyl-peroxide; 2,2'-azobis(2,4-dimethylvaleronitrile); tert-butylazo-2-cyanobutane; dibenzoylperoxide; tert-butyl-per-2ethyl-hexanoate; tert-butylpermaleate; 2,2'-azobis (isobutyronitrile); bis(tert-butylperoxy)cyclohexane; tert-butyl-peroxyisopropylcarbonate; tert-butylperacetate; 2,2'-bis(tert-butylperoxy)butane; dicumyl peroxide; di-tert-amyl peroxide; di-tert-butyl peroxide (DTBP); p-methane hydroperoxide; pinane hydroperoxide; cumene hydroperoxide; and tert-butyl hydroperoxide.

The process of the invention is carried out at temperatures of typically at least 10° C., preferably of at least 25° C., more preferably of at least 45° C.

The pressure is typically maintained at a value of more than 25 bar, preferably of more than 50 bar, even more preferably of more than 75 bar.

The VDF polymer of the invention has an intrinsic viscosity of from 0.05 to 0.75 l/g, preferably of from 0.10 to 0.55 l/g, more preferably of from 0.15 to 0.45 l/g, as measured at 25° C. in N,N-dimethylformamide.

In a third instance, the present invention pertains to a composition [composition (C)] comprising at least one polymer (VDF) of the invention.

The composition (C) of the invention may further comprise one or more additives.

Non-limiting examples of suitable additives include, for instance, plasticizers such as dibutyl sebacate.

In a fourth instance, the present invention pertains to an article comprising the composition (C) of the invention.

The article of the invention is typically obtainable by processing the composition (C) of the invention using melt processing techniques such as injection or compression moulding.

The article of the invention is particularly suitable for use in various applications such as battery applications.

In particular, the polymer (VDF) of the invention is suitable for use in components for secondary batteries such as electrodes and/or separators for secondary batteries, especially in Lithium-ion batteries.

The polymer (VDF) of the invention is particularly suitable as binder in electrodes for secondary batteries, especially Lithium-ion batteries.

Also, the polymer (VDF) of the invention is particularly suitable for use in separators for secondary batteries, especially Lithium-ion batteries, such as composite separators comprising:
  at least one substrate layer comprising, preferably consisting of at least one polyolefin, and
  adhered to said substrate layer, at least one layer comprising, preferably consisting of, at least one polymer (VDF) of the invention.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

The polyalkylene oxides used in the hereby exemplified working embodiments are polyethylene oxides (PEO) commercially available under the trademark name ALKOX® (Meisei Chemical Works, Ltd) (hereinafter referred to as "a1").

Their properties are listed in Table 1 here below:

TABLE 1

| Grade of ALKOX ® | Molecular weight [g/mol] | Viscosity of solution in water | |
|---|---|---|---|
| PEO | (×1000) | % wt. | mPa · s |
| E-45 | 600-800 | 2 | 300-600 |
| E-60 | 1,000-1,200 | 2 | 2,000-4,000 |

The following polysaccharide derivatives were used:
1. METHOCEL® K100GR, a hydroxypropyl methylcellulose having a dynamic viscosity of 80-120 mPa·s at 20° C. in an aqueous solution at a concentration of 2% by weight (hereinafter referred to as "b1").
2. BERMOCOLL® E 230 FQ, a hydroxyethyl ethylcellulose having a viscosity of 260-360 mPa·s at 20° C. in an aqueous solution at a concentration of 2% by weight, as measured by Brookfield LV (hereinafter referred to as "b2").

General Procedure for the Synthesis of Polymer (VDF)

Synthesis of Polymer (VDF) in a 4 Litres Reactor

In a 4 litres reactor were introduced in sequence the demineralized water and two suspending agents: METHOCEL® K100 hydroxypropyl methylcellulose and ALKOX® PEO grades as shown in Table 2.

The mixture was stirred with an impeller running at a speed of 880 rpm. The reactor was purged with a sequence of vacuum (30 mmHg) and purged of nitrogen (fixed at 1 bar) at a fixed temperature of 20° C. This sequence was done 3 times. Then, the diethyl carbonate (DEC), the initial acrylic acid (AA) and t-amyl perpivalate (TAPPI) were added in the reactor as described in Table 2. The VDF was introduced in the mixture as the quantity defined in the Table 2.

The reactor was gradually heated until the set-point temperature described in Table 2. At this temperature, the pressure was fixed at 110 or 120 bar as described in Table 2. The pressure was kept constantly equal by feeding a right amount of the differed acrylic acid (AA) solubilized in demineralized water at a concentration described in Table 2. The pressure then was decreased to 90 bar (for the initial pressure at 110 bar) or 96 bar (for the initial pressure at 120 bar). In general, a conversion around 75-80% of VDF was achieved in all working embodiments. The polymerization was stopped by degassing the reactor until reaching atmospheric pressure.

The VDF copolymer was collected by filtration and washed in demineralized water. After the washing step, the polymer powder was dried in an oven at 65° C. overnight.

Synthesis of Polymer (VDF) in a 85 Litres Reactor

In a 85 litres reactor were introduced in sequence the demineralized water and one or two suspending agents: METHOCEL® K100 hydroxypropyl methylcellulose (or BERMOCOLL® E 230 FQ hydroxyethyl ethylcellulose) and ALKOX® PEO grades as shown in Table 2.

The mixture was stirred with an impeller running at a speed of 250 rpm. The reactor was purged with a sequence of vacuum (30 mmHg) and purged of nitrogen (fixed at 1 bar) at a fixed temperature of 20° C. This sequence was done 3 times and then the mixture was stirred at a speed of 300 rpm. The initial amount of the acrylic acid (AA) was added to the reactor as described in Table 2. Then, t-amyl perpivalate (TAPPI) was added in the reactor as described in Table 2. The VDF was introduced in the mixture as the quantity described in Table 2.

The reactor was gradually heated until the set-point temperature described in Table 2. At this temperature, the pressure was fixed at 110 bar or 120 bar. The pressure was kept constantly equal by feeding a right amount of the differed acrylic acid (AA) in demineralized water at a concentration described in Table 2. The pressure then was decreased to 90 bar (for the initial pressure at 110 bar) or 96 bar (for the initial pressure at 120 bar). In general, a conversion around 75-85% of monomers was achieved in all working embodiments. The polymerization was stopped by degassing the reactor until reaching atmospheric pressure.

The VDF copolymer was collected by filtration and washed in demineralized water. After the washing step, the polymer powder was dried at a targeted outgoing air temperature at 65° C. for 2 h in a Aeromatic AG fluidized bed.

Control of the Reaction (CR)

The control of the reaction (CR) was determined as a measure of the deviation of the temperature reaction with respect to the set temperature. A deviation of more than 0.5° C. with respect to the set temperature was considered not good (NG), a value between 0.2° C. and 0.5° C. was considered satisfactory (S) and a value lower than 0.2° C. was considered excellent (E). The comparison was made on the trials run in the 85 liter reactor according to the general procedure as detailed above.

Preparation of Polymer (VDF) Plaques

The VDF polymer plaques were obtained by compression molding. The press temperature was set up at 190° C. and 60 g of polymer were introduced in a frame with a size of 130×130×1.5 mm.

The molding required three steps: (1) five minutes for the preheating step at 190° C.; (2) one minute for the degassing step and (3) two minutes for the molding step under 16 000 Kg. After these steps, the plaque was cooled between two plates cooled with water at room temperature. An Aluminium foil was used as substrate for the plaques.

Determination of Intrinsic Viscosity of Polymer (VDF)

Intrinsic viscosity (q) [dl/g] was measured using the following equation on the basis of dropping time, at 25° C., of a solution obtained by dissolving the VDF polymer in N,N-dimethyl formamide at a concentration of about 0.2 g/dl using a Ubbelhode viscosimeter:

$$[\eta] = \frac{\eta_{sp} + \Gamma \cdot \ln \eta_r}{(1+\Gamma) \cdot c}$$

where c is polymer concentration [g/dl], $\eta_r$ is the relative viscosity, i.e. the ratio between the dropping time of sample solution and the dropping time of solvent, $\eta_{sp}$ is the specific viscosity, i.e. $\eta_r-1$, and $\Gamma$ is an experimental factor, which for the VDF polymer corresponds to 3.

Colour Retention

Levels of whiteness of the polymer (VDF) were determined by measuring the Whiteness Index (WI) according to ASTM E313 standard method and categorized as white (W) (WI>45) and near-white (NW) (35<WI<45).

EXAMPLES 1-7

The process conditions are set forth in Table 2.

Examples 1, 2, 6 and 7 were carried out in the 85 litres reactor according to the general procedure as detailed above.

Examples 3, 4 and 5 were carried out in the 4 litres reactor according to the general procedure as detailed above.

Example 3 was carried out according to the general procedure as detailed above using diethyl carbonate (DEC) in an amount of 26 g/Kg of vinylidene fluoride.

Comparative Examples 1-2

The process conditions are set forth in Table 2.

Comparative Examples 1 and 2 were carried out in the 85 litres reactor according to the general procedure as detailed above but without adding the ALKOX® PEO grades.

TABLE 2

| Run | Water [Kg] | TAPPI [g/Kg VDF] | VDF [Kg] | AA [g] Initial | AA [g] Differed | Suspending agent [g/Kg VDF] a1 | b1 | b2 |
|---|---|---|---|---|---|---|---|---|
| T = 55° C., P = 110 bar, AA = 14-15 g/Kg of water | | | | | | | | |
| Ex. 1 | 46.2 | 2.85 | 25.27 | 10.8 | 253 | 0.125 (E-60) | 0.8 | — |
| Ex. 2 | 46.2 | 2.75 | 25.27 | 10.8 | 268 | 0.2 (E-45) | 0.5 | — |
| Ex. 3 | 2.16 | 5.0 | 1.17 | 0.5 | 12 | 0.2 (E-45) | 0.5 | — |
| C. Ex. 1 | 48.1 | 2.85 | 25.27 | 10.8 | 253 | — | 0.8 | — |
| T = 50° C., P = 120 bar, AA = 12.5 g/Kg of water | | | | | | | | |
| Ex. 4 | 2.23 | 2.9 | 1.15 | 0.4 | 9 | 0.8 (E-45) | 0.4 | — |
| Ex. 5 | 2.24 | 2.9 | 1.16 | 0.4 | 9 | 1.5 (E-45) | 0.4 | — |
| Ex. 6 | 48.85 | 2.9 | 25.33 | 8.4 | 204 | 0.2 (E-45) | 0.5 | — |
| Ex. 7 | 48.85 | 2.9 | 25.33 | 8.4 | 204 | 0.8 (E-45) | — | 1.5 |
| C. Ex. 2 | 48.85 | 2.9 | 25.33 | 8.4 | 204 | — | — | 1.5 |

As shown in Table 3, it has been found that the process of the invention advantageously enables obtaining VDF polymers as notably embodied by the polymers obtained according to the process of any one of Examples 1 to 7 exhibiting both good colour retention and good thermal stability to be suitably used in various applications.

On the other side, the process for manufacturing the polymers of any of Comparative Examples 1 and 2, in the absence of a polyalkylene oxide, even using high amounts of a polysaccharide derivative, is not enough stable to be scaled up at industrial level.

TABLE 3

| Run | Control of reaction | Colour retention [190° C.] | Viscosity [l/g] |
| --- | --- | --- | --- |
| Ex. 1 | E | NW | 0.30 |
| Ex. 2 | E | NW | 0.33 |
| Ex. 3 | — | NW | 0.10 |
| C. Ex. 1 | NG | — | 0.30 |
| Ex. 4 | — | W | 0.39 |
| Ex. 5 | — | W | 0.40 |
| Ex. 6 | E | NW | 0.37 |
| Ex. 7 | E | NW | 0.36 |
| C. Ex. 2 | NG | — | 0.37 |

The invention claimed is:

1. A process for manufacturing a vinylidene fluoride polymer (VDF), said process comprising polymerizing vinylidene fluoride and from 0.01% to 10% by moles, with respect to the total amount of moles of said vinylidene fluoride, of at least one (meth)acrylic monomer (MA) and, optionally, at least one fluorinated monomer different from vinylidene fluoride in an aqueous suspension medium comprising:

at least one polyalkylene oxide of formula (I):

$$R_A O-[(CH_2)_m O]_n-R_B \qquad (I)$$

wherein $R_A$ and $R_B$, equal to or different from each other, are H or a $C_1$-$C_5$ linear or branched alkyl group, m, equal to or different from each other at each occurrence, is an integer from 2 to 5, and n is an integer from 1000 to 200000, and at least one polysaccharide derivative in an amount of from 0.4 to 0.8 g, per Kg of vinylidene fluoride.

2. The process according to claim 1, wherein the monomer (MA) is of formula (II):

wherein $R_1$, $R_2$ and $R_3$, equal to or different from each other, are independently a hydrogen atom or a $C_1$-$C_3$ hydrocarbon group, and $R_x$ is a hydrogen or a $C_1$-$C_5$ hydrocarbon group optionally comprising at least one hydroxyl group.

3. The process according to claim 1, wherein the polyalkylene oxide of formula (I) is a polyethylene oxide of formula (I-A):

$$R'_A O-(CH_2 CH_2 O)_{n'}-R'_B \qquad (I-A)$$

wherein $R'_A$ and $R'_B$, equal to or different from each other, are H or a $C_1$-$C_5$ linear or branched alkyl group, and n' is an integer from 1000 to 200000.

4. The process according to claim 1, wherein the polyalkylene oxide of formula (I) is a polyethylene glycol of formula (1-B):

$$HO-(CH_2 CH_2 O)_{n''}-H \qquad (1-B)$$

wherein n" is an integer from 1000 to 200000.

5. The process according to claim 1, said process being carried in the presence of at least one polyalkylene oxide of formula (I), in an amount of from 0.01 to 5 g per Kg of vinylidene fluoride.

6. The process according to claim 1, wherein the polysaccharide derivative comprises recurring units derived from glycosidic units selected from the group consisting of D-glucopyranosides, D-glucofuranosides and mixtures thereof, said glycosidic units being linked to each other by glycosidic bonds.

7. The process according to claim 1, wherein the polysaccharide derivative comprises recurring units derived from β-D-glucopyranosides of formula (III) linked to each other by β-glycosidic bonds:

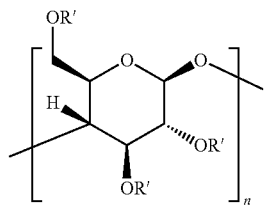

wherein each R', equal to or different from any other at each occurrence, represents a hydrogen atom, a $C_1$-$C_8$ hydrocarbon group or a $C_2$-$C_8$ hydroxyalkyl group.

8. The process according to claim 7, wherein each R', equal to or different from any other, is a hydrogen atom, a methyl group, a hydroxyethyl group or a 2-hydroxypropyl group.

9. The process according to claim 1, wherein the polysaccharide derivative is selected from the group consisting of methylcellulose, hydroxyethyl methylcellulose, hydroxyethyl ethylcellulose and hydroxypropyl methylcellulose.

10. The process according to claim 1, wherein the weight ratio of at least one polyalkylene oxide of formula (I) to at least one polysaccharide derivative is comprised between 1:10 and 10:1.

11. A vinylidene fluoride polymer (VDF) obtainable by the process according to claim 1.

12. A composition (C) comprising at least one polymer (VDF) according to claim 11.

13. An article comprising the composition (C) according to claim 12.

14. The article according to claim 13, which is a binder in electrodes for secondary batteries or a separator for secondary batteries.

15. The process according to claim 1, wherein the vinylidene fluoride is polymerized with 0.1% to 3% by moles, with respect to the total amount of moles of said vinylidene fluoride, of at least one (meth)acrylic monomer (MA).

16. The process according to claim 1, wherein n is an integer from 5000 to 70000.

17. The process according to claim 3, wherein n' is an integer from 5000 to 70000.

18. The process according to claim 4, wherein n" is an integer from 5000 to 70000.

19. The process according to claim 1, said process being carried in the presence of at least one polyalkylene oxide of formula (I-A) or at least one polyethylene glycol of formula (1-B), in an amount of from 0.05 to 1.5 g of per Kg of vinylidene fluoride.

* * * * *